United States Patent [19]
Lane

[11] Patent Number: 5,653,001
[45] Date of Patent: Aug. 5, 1997

[54] FRICTIONAL LOCK HINGE

[76] Inventor: Bert Lane, 3675 N Country Club La., #208, North Miami, Fla. 33180

[21] Appl. No.: 582,591

[22] Filed: Jan. 3, 1996

[51] Int. Cl.⁶ .......................... E05C 17/64; A47B 95/02
[52] U.S. Cl. .......................... 16/340; 16/114 R; 220/335
[58] Field of Search .................. 16/340, 338, 337, 16/114 R, 112, 124–127, 110 A; 220/335

[56] References Cited

U.S. PATENT DOCUMENTS

| | | | |
|---|---|---|---|
| 1,139,193 | 5/1915 | Kischner. | |
| 1,503,190 | 7/1924 | Kim | 220/335 |
| 1,930,841 | 10/1933 | Miniere | 220/335 |
| 4,630,332 | 12/1986 | Bisbing | 16/340 |
| 4,794,667 | 1/1989 | Nelson et al. | 16/114 R |
| 5,154,499 | 10/1992 | Atkinson et al. | 16/340 |

FOREIGN PATENT DOCUMENTS 1595444  9/1990  U.S.S.R. .......... 16/114 R

*Primary Examiner*—Chuck Y. Mah
*Attorney, Agent, or Firm*—Herbert L. Lerner; Laurence A. Greenberg

[57] ABSTRACT

A frictional lock hinge for pivotally connecting a base and a lid of a container permits the lid to easily toggle between a locked and an unlocked state with respect to the base. The hinge includes a handle. A first hinge member is positioned between arms of the handle and has two eyed ears, one being threaded. A second hinge member has an eye positioned between the eyed ears of the first hinge member. The frictional lock hinge also includes a pin, whose second end is threaded and passes through openings in the arms of the handle, the eyed ears of the first hinge member and the eye of the second hinge member. The second end of the pin also threads into the threaded eyed ear of the first hinge member. Furthermore, a stop is disposed on the first end of the pin. The stop has a diameter greater than the diameter of the second end of the pin. Additionally, a lock nut is threaded on the second end of the pin. The frictional lock hinge is toggled between the locked and unlocked states by turning the handle to rotate the pin and draw the stop toward the threaded ear which locks/unlocks the first and second hinge members. A container which is also provided has the described frictional lock hinge for pivotally connecting the base and the lid. The container may be a portable solar oven, a suitcase or a portable computer.

15 Claims, 4 Drawing Sheets

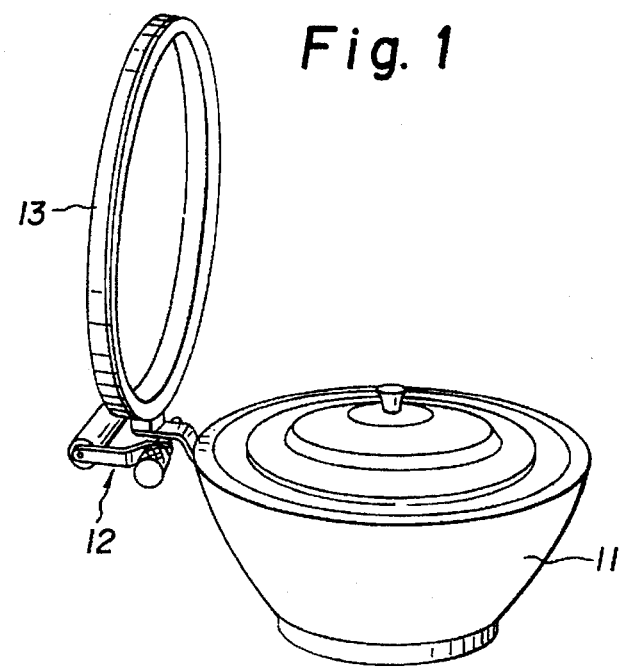
Fig. 1
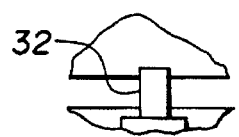
Fig. 3a
Fig. 2a
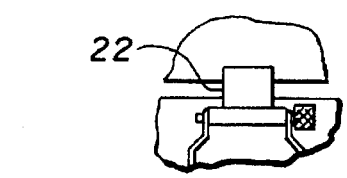
Fig. 3
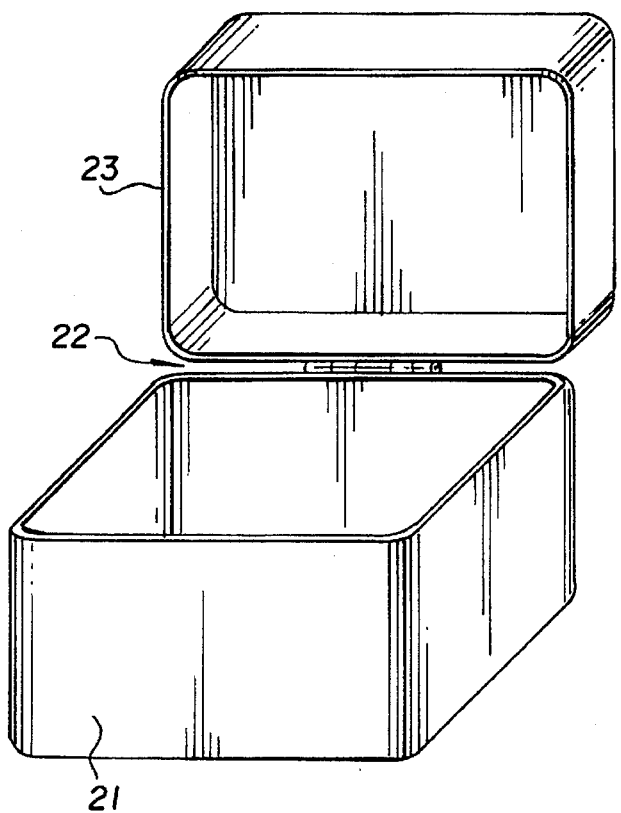
Fig. 2

FRICTIONAL LOCK HINGE

BACKGROUND OF THE INVENTION

1. Field of the Invention

The invention relates to a frictional lock hinge device capable of locking the hinge in various desired positions for use with a solar cooker and other containers having a base and a lid. More particularly, the frictional lock hinge device can be used to lock the lid of a solar cooker or other similar container in various desired positions.

2. Description of the Related Art

Prior to this invention, various lock hinge devices were described in the following U.S. Pat. Nos.: Pottle (U.S. Pat. No. 509,047), Runkel (U.S. Pat. No. 1,350,423), Janca (U.S. Pat. No. 1,569,089), Ryan et al. (U.S. Pat. No. 1,634,052), and Sperzel (U.S. Pat. No. 3,239,874).

Pottle, Ryan et al. and Sperzel all relate to radial frictional lock hinge devices, but do not suitably disclose an axial frictional lock hinge device. Runkel and Janca relate to axial frictional lock hinge devices, but do not provide a mechanism for easily toggling the device between the locked and unlocked positions. In order to lock the disclosed axial frictional lock hinges of Runkel and Janca, the devices must be tightened some undetermined amount. Similarly, the devices must be untightened some undetermined amount to unlock the axial frictional lock hinges of those references. Such undetermined amount must be manually tested periodically by the operator until the desired position has been reached.

SUMMARY OF THE INVENTION

It is accordingly an object of the invention to provide a frictional lock hinge, which overcomes the above-mentioned disadvantages of the heretofore-known devices and methods of this general type and which may easily be toggled between the locked and unlocked positions.

With the foregoing and other objects in view there is provided, in accordance with the invention, in a container having a base and a lid, a frictional lock hinge for pivotally connecting the base and the lid having a handle. A first hinge member is positioned between arms of the handle and has two eyed ears, one of which is threaded. A second hinge member has an eye positioned between the eyed ears of the first hinge member. The frictional lock hinge also includes a pin. A second end of the pin is threaded and passes through openings in the arms of the handle, the eyed ears of the first hinge member and the eye of the second hinge member. The second end of the pin also threads into the threaded eyed ear of the first hinge member. Furthermore, a stop is disposed on the first end of the pin adjacent one of the arms of the handle. The stop has a diameter greater than the diameter of the second end of the pin. Additionally, a lock nut is threaded on the second end of the pin. The frictional lock hinge is toggled between the locked and unlocked states by turning the handle to rotate the pin and draw the stop toward the threaded ear which locks/unlocks the first and second hinge members.

In accordance with an added feature of the invention there is provided, a frictional lock hinge having a handle. A first hinge member is positioned between arms of the handle and has two eyed ears, one of which is threaded. A second hinge member has an eye positioned between the eyed ears of the first hinge member. The frictional lock hinge also includes a pin. A second end of the pin is threaded and passes through openings in the arms of the handle, the eyed ears of the first hinge member and the eye of the second hinge member. The second end of the pin also threads into the threaded eyed ear of the first hinge member. Furthermore, a stop is disposed on the first end of the pin adjacent one of the arms of the handle. The stop has a diameter greater than the diameter of the second end of the pin. Additionally, a lock nut is threaded on the second end of the pin. The frictional lock hinge is toggled between the locked and unlocked states by turning the handle to rotate the pin and draw the stop toward the threaded ear which locks/unlocks the first and second hinge members.

In accordance with an additional feature of the invention there is provided a container having a base, a lid and a frictional lock hinge for pivotally connecting the base and the lid. The frictional lock hinge includes a handle and a first hinge member positioned between arms of the handle. The first hinge member has two eyed ears, one of which is threaded. A second hinge member has an eye positioned between the eyed ears of the first hinge member. The frictional lock hinge also includes a pin. A second end of the pin is threaded and passes through openings in the arms of the handle, the eyed ears of the first hinge member and the eye of the second hinge member. The second end of the pin also threads into the threaded eyed ear of the first hinge member. Furthermore, a stop is disposed on the first end of the pin adjacent one of the arms of the handle. The stop has a diameter greater than the diameter of the second end of the pin. Additionally, a lock nut is threaded on the second end of the pin. The frictional lock hinge is toggled between the locked and unlocked states by turning the handle to rotate the pin and draw the stop toward the threaded ear which locks/unlocks the first and second hinge members.

In accordance with another feature of the invention, the stop is integral with the first end of the pin.

In accordance with a further feature of the invention, the stop is a head on the pin.

In accordance with again an added feature of the invention, the stop is at least one nut threaded on the first end of the pin.

In accordance with again an additional feature of the invention, the stop is a handle with a step.

In accordance with again another feature of the invention, the container is a portable solar oven.

In accordance with again a further feature of the invention, the container is a suitcase.

In accordance with yet an added feature of the invention, the container is a portable computer.

Other features which are considered as characteristic for the invention are set forth in the appended claims. Although the invention is illustrated and described herein as embodied in a frictional lock hinge, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIG. 1 is a diagrammatic, side-perspective view of a portable solar oven having a frictional lock hinge according to the invention;

FIG. 2 is a perspective view of a suitcase having the frictional lock hinge;

FIG. 2a is a fragmentary, rear-elevational view of the suitcase having the frictional lock hinge;

FIG. 3 is a perspective view of a portable computer having the frictional lock hinge;

FIG. 3a is a fragmentary, rear-elevational view of the portable computer having the frictional lock hinge;

DESCRIPTION OF THE PREFERRED EMBODIMENTS

Figure 4:
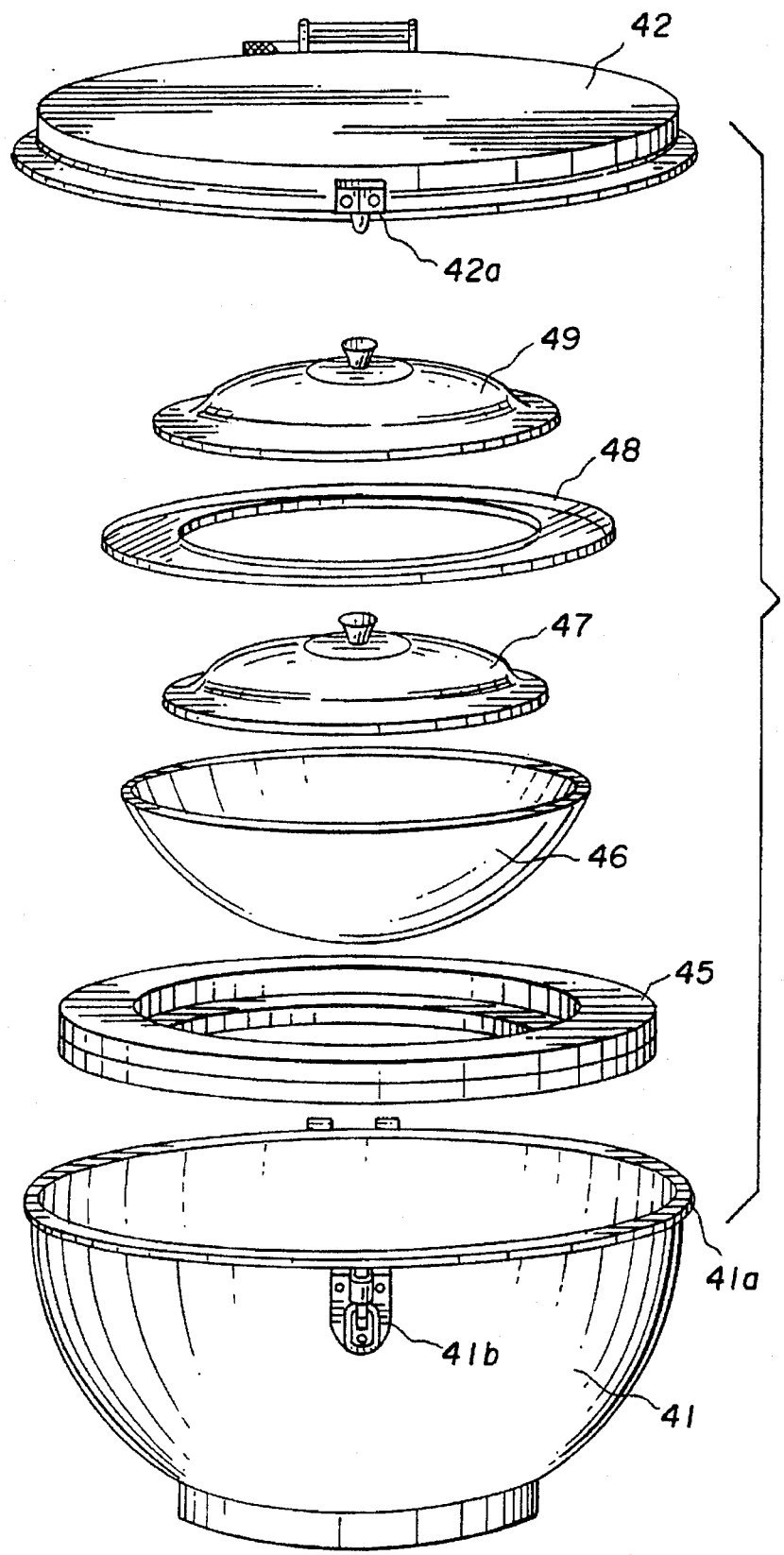
FIG. 4 is an exploded, perspective view of a portable solar oven having the frictional lock hinge.

Referring now to the figures of the drawing in detail and first, particularly, to FIG. 1 thereof, there is seen a container in the form of a portable solar oven having a frictional lock hinge. The portable solar oven has a frictional lock hinge 12 which adjustably attaches a lid 13 to a base 11. The lid 13 of the solar oven may be lifted into various positions relative to the base 11 as the frictional lock hinge rotates. Also, the lid 13 may be locked in any position (opened, closed, or partially opened) by engaging the frictional lock hinge 12.

Similar to FIG. 1, FIG. 2 depicts a container in the form of a suitcase. The suitcase has a frictional lock hinge 22 which adjustably attaches a lid 23 to a base 21 of the suitcase. The lid 23 of the suitcase may be lifted into various positions relative to the base 21 as the frictional lock hinge rotates. The lid 23 may be locked in any position (opened, closed, or partially opened) by engaging the frictional lock hinge 22.

Similarly, FIG. 3 shows a container in the form of a portable computer. The portable computer has a frictional lock hinge 32 which adjustably attaches a lid 33 to a base 31. The lid 33 of the portable computer may be lifted into various positions relative to the base 31 as the frictional lock hinge rotates. Also, the lid 33 may be locked in any position (opened, closed, or partially opened) by engaging the frictional lock hinge 32.

Figure 4A:
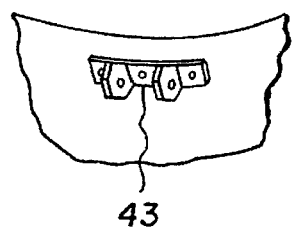
FIG. 4a is a fragmentary, rear-perspective view of the base of a portable solar oven with a hinge member from the frictional lock hinge being attached.
Figure 4B:
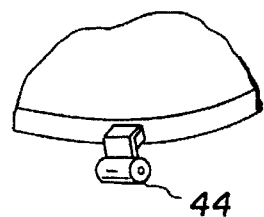
FIG. 4b is a fragmentary, rear-perspective view of the lid of a portable solar oven with a second hinge member from the frictional lock hinge being attached.

In FIG. 4, there is seen an exploded view of a portable solar oven having a frictional lock hinge. The portable solar oven has a base 41. A collar 45, a bowl 46, a lid 47, a collar 48, and a lid 49 fit inside the base 41. A lid 42 fits over a lip 41a of the base 41. A frictional lock hinge, which is not pictured in FIG. 4, connects the lid 42 to the base 41. FIG. 4a depicts a first hinge member 43 of the frictional lock hinge attached to the base of the portable solar oven. FIG. 4b shows a second hinge member 44 of the frictional lock hinge attached to the lid of the portable solar oven. A front latch 41b, 42a locks the lid to the base 41 in the front for added security when the oven is being carried.

Figure 5A:
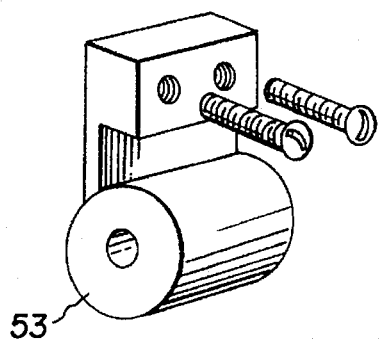
FIG. 5a is a rear-perspective view of a second hinge member from a frictional lock hinge.
Figure 5:
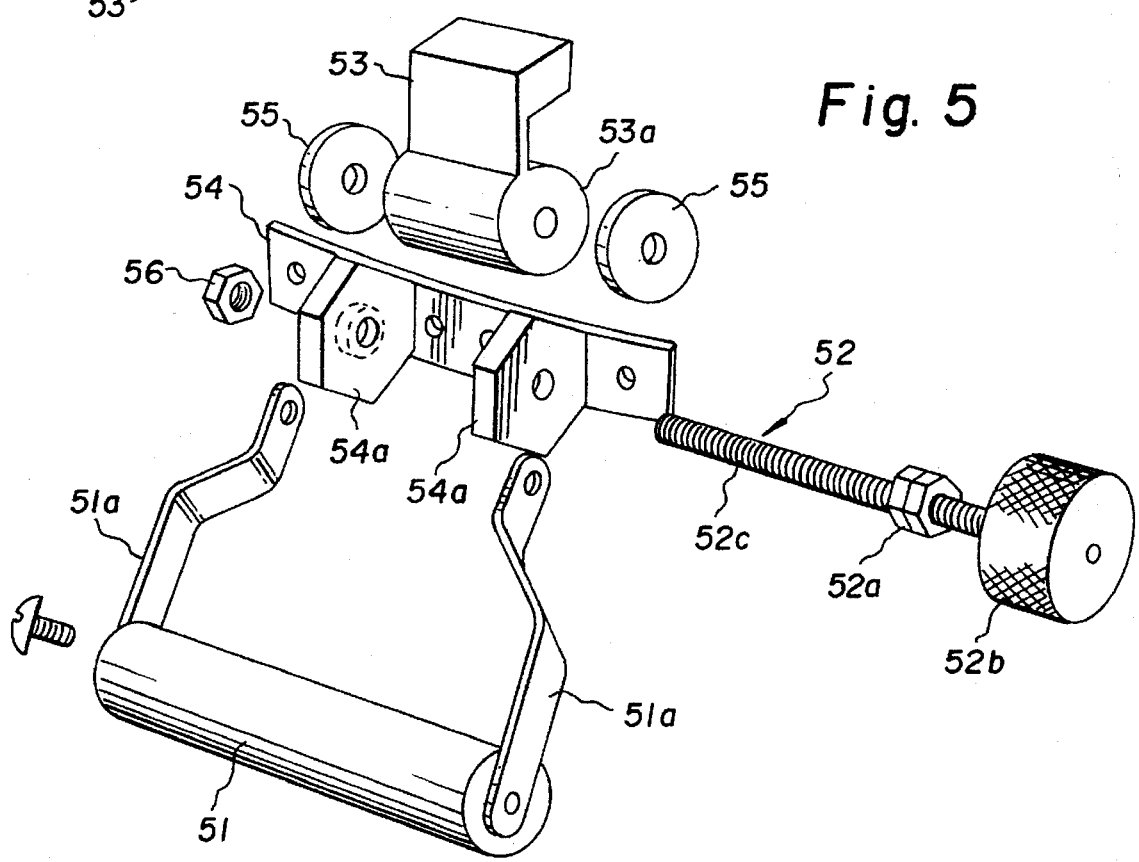
FIG. 5 is an enlarged, exploded perspective view of a frictional lock hinge.

In FIG. 5, there is seen a frictional lock hinge having a handle 51 with two arms 51a. The arms 51a each have an opening on one end. The frictional lock hinge also has a first hinge member 54 with two eyed ears 54a that are to be positioned between the arms 51a of the handle 51. Additionally, the frictional lock hinge has a second hinge member 53 with an eye 53a to be positioned between the ears 54a of the first hinge member 54. Washers 55 are to be positioned on either side of hinge member 53. The frictional lock hinge further includes a pin 52 which has a first end 52b and a second end 52c. A stop including adjustment nuts 52a is threaded on the the pin 52 proximal to the first end 52b. The second end 52c of the pin 52 passes through the openings in the arms 51a of the handle 51, through the eyed ears 54a of the first hinge member 54 and through the eye 53a of the second hinge member 53. The eyed ear 54a of the first hinge member 54, which is positioned distally to the first end 52b of the pin 52, is threaded. The second end 52c of the pin 52 threads into the threaded eyed ear 54a of the first hinge member 54. A lock nut 56 threads on the second end 52c of the pin 52 and is positioned farther from the first end 52b of the pin 52 than the handle 51 and the first and second hinge members 53 and 54.

Figure 6A:
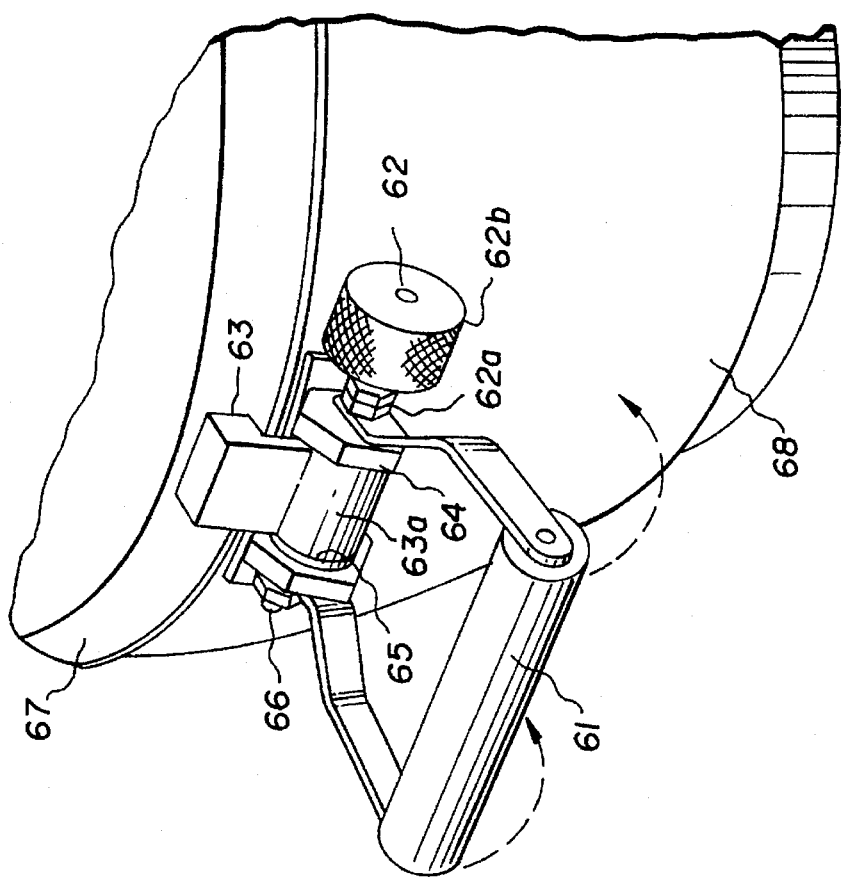
FIG. 6a is a view similar to FIG. 6 showing a locked position of the frictional lock hinge.
Figure 6:
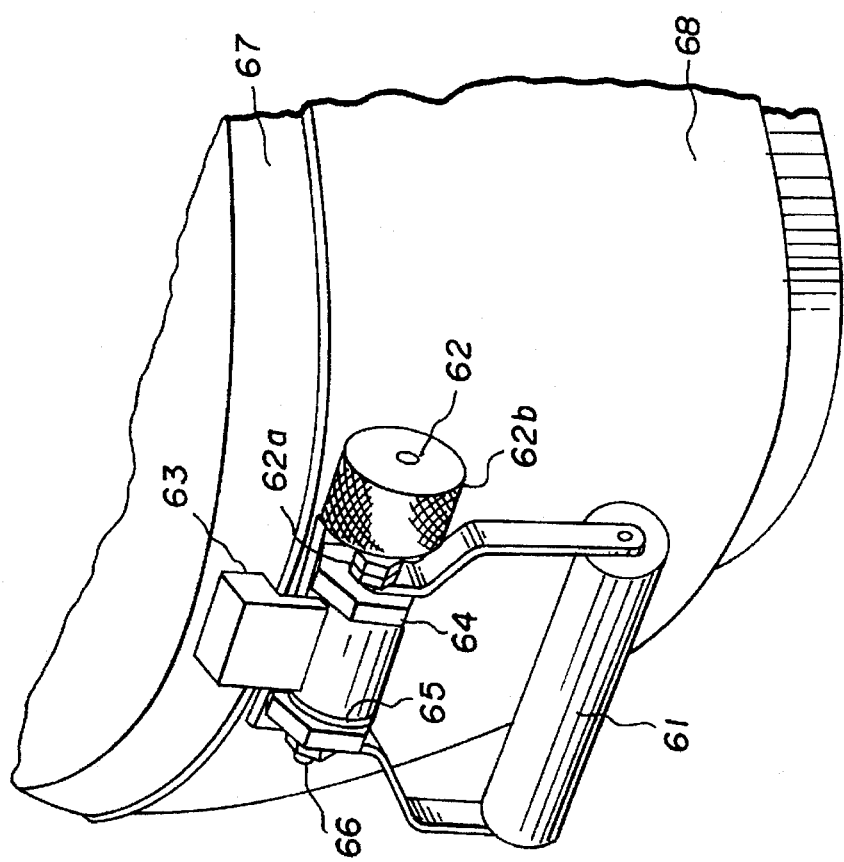
FIG. 6 is a fragmentary, perspective view of a frictional lock hinge in an unlocked position.

As shown in FIG. 6, arms of a handle 61 are in direct contact with ears of a first hinge member 64. The ears of the hinge member 64 are directly next to the washers 65. Furthermore, an eye of a second hinge member 63 is located between the washers 65. A pin 62 then passes through the openings in the arms of the handle 61, the ears of the first hinge member 64, the openings in the washers 65, and the eye 63a of the second hinge member 63. A lock nut 66 is threaded on the pin 62, preventing the pin 62 from passing back through the openings in the arms of the handle 61, the ears of the first hinge member 64, the openings in the washers 65, and the eye of the second hinge member 63. A stop including adjustment nuts 62a prevents the pin from passing completely through the openings in the arms of the handle 61, the ears of the first hinge member 64, the openings in the washers 65, and the eye of the second hinge member. The elements 61–66 of the frictional lock hinge are tightened against one another by turning the first end 62b of the pin 62 only enough to ensure that the lid 67 may still be opened, closed, or partially opened relative to the base 68.

Raising the handle 61 to the position shown in FIG. 6a further tightens the frictional lock hinge parts 61–66. This action locks the lid 67 in its current position (opened, closed, or partially closed) relative to the base 68. Lowering the handle 61 in the direction of the dotted line arrows in FIG. 6a, into the position shown in FIG. 6, loosens the frictional lock hinge. More specifically, in order to lock the frictional lock hinge, the thumb of the left hand is rested on the first end 62b of the pin 62 while lifting the handle 61 with the fingers of the left hand. This motion tightens the elements between the adjustment nuts 62a of the stop and the threaded ear 64 against one another, so that the ears 64 grip the eye 63a and lock the lid in place. Lowering the handle loosens these elements and thus the lid.

Since the handle projects from the container, but does not cross the plane of the lid, the container may be comfortably carried at one's side.

I claim:

1. In a container having a base and a lid, a frictional lock hinge for pivotally connecting the base and the lid, comprising:

a. a handle with two arms each having an end with an opening formed therein;

b. a first hinge member having two eyed ears positioned between said arms of said handle, one of said eyed ears being threaded, a second hinge member having an eye positioned between said eyed ears of said first hinge member, each of said hinge members being connected to a respective one of the base and the lid;

c. a pin having a first end and a second end with a given diameter, said second end being threaded and passing through said openings in said arms of said handle, said eyed ears of said first hinge member and said eye of said second hinge member and being threaded into said threaded eyed ear of said first hinge member;

d. a stop being disposed on said first end of said pin adjacent one of said arms of said handle, said stop having a diameter being greater than said given diameter; and e. a lock nut threaded on said second end of said pin positioned distally to said first end of said pin, for locking said first and second hinge members together by rotating said handle about an axis of said pin to thereby rotate said pin and draw said stop toward said threaded ear.

2. The frictional lock hinge of claim 1, wherein said stop is integral with said first end of said pin.

3. The frictional lock hinge of claim 2, wherein said stop is a head on said pin.

4. The frictional lock hinge of claim 1, wherein said stop is at least one nut threaded on said first end.

5. A frictional lock hinge, comprising:

a. a handle with two arms each having an end with an opening formed therein;

b. a first hinge member having two eyed ears positioned between said arms of said handle, one of said eyed ears being threaded;

c. a second hinge member having an eye positioned between said eyed ears of said first hinge member;

d. a pin having a first end and a second end with a given diameter, said second end being threaded and passing through said openings in said arms of said handle, said eyed ears of said first hinge member and said eye of said second hinge member and being threaded into said threaded eyed ear of said first hinge member;

e. a stop being disposed on said first end of said pin adjacent one of said arms of said handle, said stop having a diameter being greater than said given diameter; and f. a lock nut threaded on said second end of said pin positioned distally to said first end of said pin, for locking said first and second hinge members together by rotating said handle about an axis of said pin to thereby rotate said pin and draw said stop toward said threaded ear.

6. The frictional lock hinge of claim 5, wherein said stop is integral with said first end of said pin.

7. The frictional lock hinge of claim 6, wherein said stop is a head on said pin.

8. The frictional lock hinge of claim 5, wherein said stop is at least one nut threaded on said first end.

9. A container, comprising:

a. a base;

b. a lid; and c. a frictional lock hinge for pivotally connecting said base and said lid, said frictional lock hinge including:

c1. a handle with two arms each having an end with an opening formed therein;

c2. a first hinge member having two eyed ears positioned between said arms of said handle, one of said eyed ears being threaded, a second hinge member having an eye positioned between said eyed ears of said first hinge member, each of said hinge members being connected to a respective one of said base and said lid;

c3. a pin having a first end and a second end with a given diameter, said second end being threaded and passing through said openings in said arms of said handle, said eyed ears of said first hinge member and said eye of said second hinge member and being threaded into said threaded eyed ear of said first hinge member;

c4. a stop being disposed on said first end of said pin adjacent one of said arms of said handle, said stop having a diameter being greater than said given diameter; and c5. a lock nut threaded on said second end of said pin positioned distally to said first end of said pin, for locking said first and second hinge members together by rotating said handle about an axis of said pin to thereby rotate said pin and draw said stop toward said threaded ear.

10. The container of claim 9, wherein said stop is integral with said first end of said pin.

11. The container of claim 10, wherein said stop is a head on said pin.

12. The container of claim 9, wherein said stop is at least one nut threaded on said first end.

13. The container of claim 9, wherein the container is a portable solar oven.

14. The container of claim 9, wherein the container is a suitcase.

15. The container of claim 9, wherein the container is a portable computer.

* * * * *